UNITED STATES PATENT OFFICE.

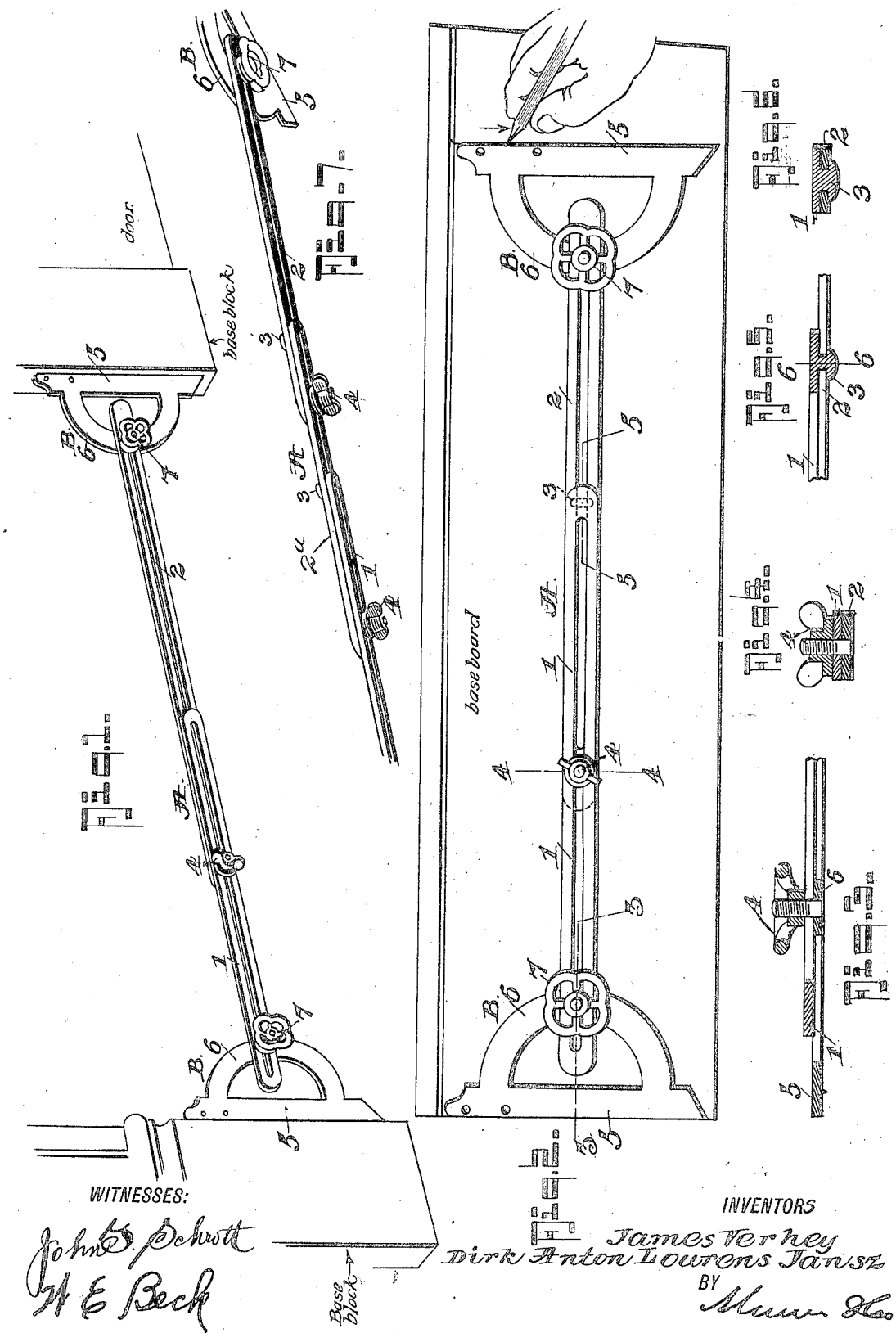

JAMES VERHEY AND DIRK A. L. JANSZ, OF PELLA, IOWA.

MEASURING INSTRUMENT.

1,205,687.

Specification of Letters Patent.

Patented Nov. 21, 1916.

Application filed April 29, 1916. Serial No. 94,359.

*To all whom it may concern:*

Be it known that we, JAMES VERHEY, a citizen of the United States of America, and DIRK A. L. JANSZ, a subject of the Queen of the Netherlands, both residents of Pella, in the county of Marion and State of Iowa, have made an Improved Measuring Instrument, of which the following is a specification.

The object of our invention is to provide for use of carpenters, cabinet-makers, and other artisans, an improved instrument for measuring the length and end angle or inclination of a base-board, shelf, stair-tread, stair-riser, chair-railing, and the like, so that the same may be fitted quickly and accurately in place.

The details of construction, arrangement and operation of the device are as hereinafter described, and illustrated in the accompanying drawing, in which, Figures 1 and 2 are a perspective view and a face view, respectively, of the tool or instrument, and illustrating the practical use of the latter. Figs. 3, 4, and 5 are cross-sections on lines 3—3, 4—4, and 5—5, respectively, of Fig. 2. Fig. 6 is a cross section on the line 6—6 of Fig. 5. Fig. 7 is a perspective view showing the body or central portion of the instrument constructed of three slidable parts in place of two as in Fig. 3.

The tool or instrument comprises the central body portion A and the duplicate heads or end portions B, which are pivoted to the ends of the body, and thus adapted to be set at different angles thereto, but in parallel planes.

As shown in Figs. 1 and 2, the body or central portion A is formed of two flat bars 1 and 2 having closed, lengthwise slots, and laid flat-wise upon each other and adapted to be slid longitudinally. They are secured together slidably by a headed stud located at 3 and a clamp-screw having a winged nut 4.

In Fig. 7, the body A is shown composed of three bars 1, 2, 2ª. The end heads or pieces B have a straight edge 5 and a curved or arc-bar 6, to which latter the ends of the body A are pivoted and to which they may be clamped by screw-bolts having enlarged mill heads 7.

According to the usual practice, if a carpenter desires to cut a base-board to fit between two base blocks or between a base block and a corner, he must obtain the exact fit of one end of the base-board. Then he must take the length of the board and mark it, and finally he must find the exact fit on the other end of the base-board. Thus there are three distinct operations required to fit the boards in place, and it often requires some additional work with a plane to make the fit sufficiently accurate. With our improved instrument, on the other hand, the operation of fitting a base-board in place is effected quickly and accurately. Place the instrument between the blocks with the heads B adjusted in contact with the latter, and then the heads of the clamp bolts are adjusted and thus the length and fit of both ends of the base-board are obtained accurately by one operation; in other words, it is effected by simply laying the instrument upon the board and marking both ends with a pencil along the line of the straight edges, as indicated in Fig. 2.

The straight edges 5 may be provided with two or more holes near one end, as shown in Figs. 1 and 2, so that if convenient or necessary, small bolts may be placed in any one of the holes, and the heads of the same will form a convenient guide or stop to work against the material to be marked.

We claim:

A measuring instrument for the purpose specified comprising a body formed of flat slotted bars that are slidable lengthwise on each other and provided with studs and clamp screws for guiding and clamping them as desired, and duplicate heads arranged in planes parallel to the body and formed of a straight edge and an arc-bar and clamp-screws securing the aforesaid body to the arc-bar, as described.

JAMES VERHEY.
DIRK A. L. JANSZ.